United States Patent [19]

Sahlin

[11] Patent Number: 5,759,924

[45] Date of Patent: Jun. 2, 1998

[54] TRANSLUCENT POLYMERIC COMPOSITE FOR USE IN AN ARCHITECTURAL LOAD-BEARING STRUCTURE

[75] Inventor: Katherine Mary Sahlin, Somerville, Mass.

[73] Assignee: Chemfab Corporation, Merrimack, N.H.

[21] Appl. No.: 733,579

[22] Filed: Oct. 18, 1996

[51] Int. Cl.⁶ .................................................. D03D 13/00

[52] U.S. Cl. .......................... 442/60; 156/308.2; 427/375; 427/389.8; 427/407.3; 428/421; 428/422; 442/59; 442/82; 442/94; 442/98; 442/180

[58] Field of Search .................................. 442/59, 60, 82, 442/94, 98, 180; 427/389.8, 407.3, 375; 428/421, 422; 156/308.2

[56] References Cited

U.S. PATENT DOCUMENTS 4,528,051  7/1985  Heinze et al. ............................. 156/92

OTHER PUBLICATIONS

John Effenberger, "Sheerfill Permanent Architectural Fabrics and Structures From Chemfab," presented at Symposium on Air–Supported Structures: State of the Art, 4 Jun. 1980, London, England.

*Primary Examiner*—James J. Bell
*Attorney, Agent, or Firm*—White & Case

[57] ABSTRACT

An improved translucent architectural fabric reinforced fluoroplastic composite is described exhibiting a transmission of normally incident visible light of at least about 23%, and when subjected to 1:1 biaxial loads up to 25% of the uniaxial tensile breaking strength of the fabric, exhibits a biaxial elongation value in the warp direction that is greater than 0 but less than 1.0%, and a biaxial elongation value in the fill direction that is greater than biaxial elongation value in the warp direction but less than 10%.

36 Claims, 3 Drawing Sheets

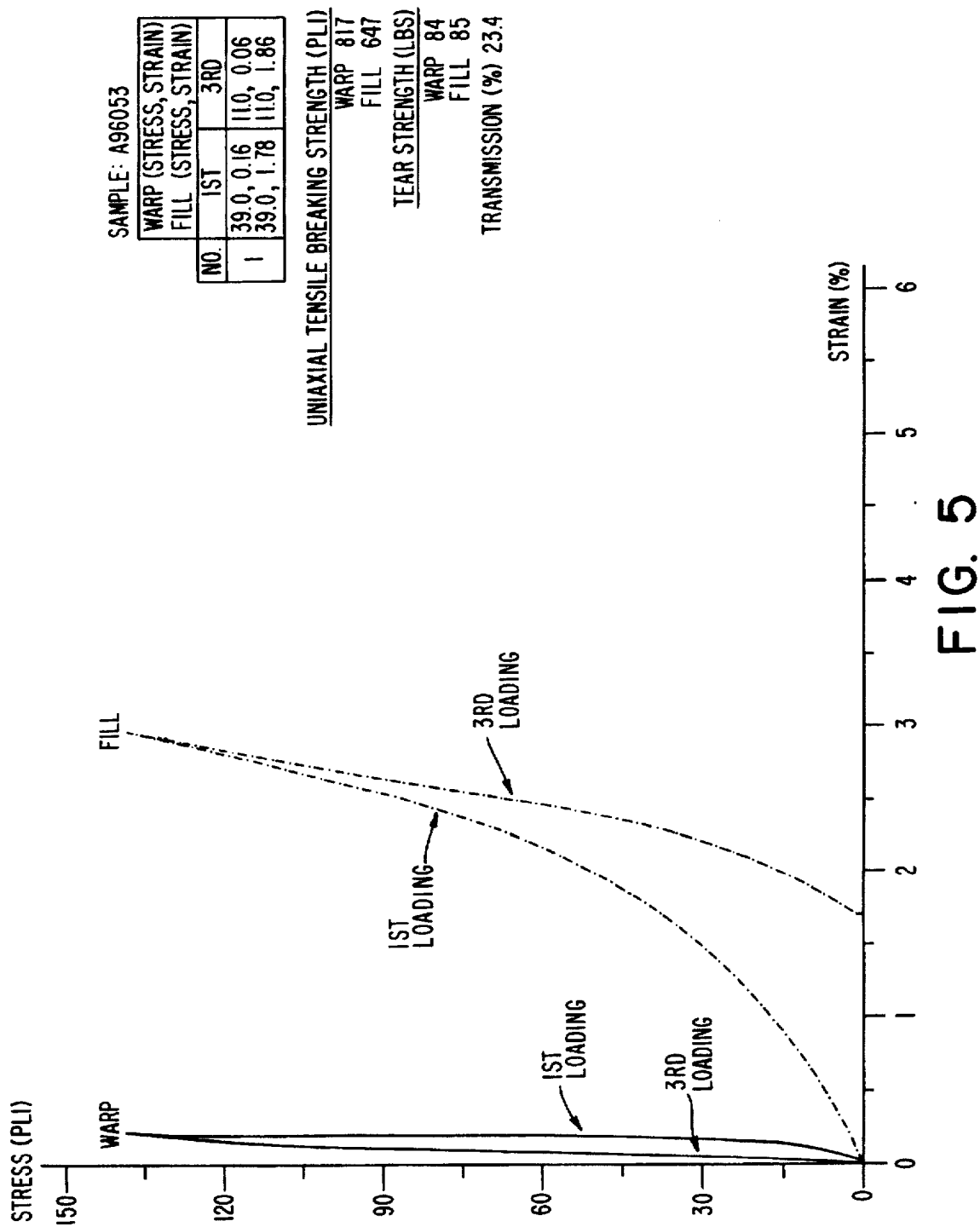

TRANSLUCENT POLYMERIC COMPOSITE FOR USE IN AN ARCHITECTURAL LOAD-BEARING STRUCTURE

CROSS-REFERENCE TO RELATED APPLICATIONS

This application claims the benefit, under 35 U.S.C. § 119(e), of U.S. Provisional patent application No. 60/021,946, filed on Jul. 17, 1996.

BACKGROUND OF THE INVENTION

1. Field of the Invention

The present invention relates to polymeric composites that are used in the construction of architectural load-bearing structures. In particular, the invention concerns a fluoropolymeric composite containing a reinforcing fabric that improves the translucency of the load-bearing structural membrane.

2. Description of the Prior Art

Structural and civil engineers have used tensioned, plastic-coated or rubber-coated fabric as load-bearing structures in building design for many years. A load-bearing structure is a building component that accommodates the application of external mechanical forces (or loads) without losing its physical integrity. A typical load-bearing structure is composed of a frame constructed of arches and/or beams. Load-bearing structures incorporating coated fabrics were employed initially in the design of air-supported shelters for travelling exhibits, and as enclosures for microwave antennae. More recently, coated-fabric, load-bearing structures have evolved into prestressed (tensioned) members with tensioning provided by stretching a coated fabric over the arches and beams of the structure. As a prestressed member, the internal tension in the stretched fabric provides additional resistance to deformation when another load is applied to the structure.

In the earliest structures incorporating coated fabrics, the fabric served as a reinforcement to control the shape of the structure and to facilitate load-bearing behavior in the structure. The most common coating materials included rubbers such as neoprene, and plastics, such as polyvinyl chloride or polyurethane. The most commonly used woven fabric reinforcements were simple, plain-woven fabrics of nylon or polyester yarns.

Prior art coated-fabrics for load-bearing structures typically incorporate additives to the coating material to protect the structure from the environment. For example, additives may be incorporated into the coated fabric to reduce the ultra-violet burden of sunlight on both the coating polymers and the fibrous reinforcement and thus enhance the outdoor durability of the coated fabric. While such additives protect the coated fabric from the environment, they also substantially reduce or eliminate the translucency of the coated fabric. Light is transmitted through the coated fabric by passing through the myriad of tiny gaps or openings in the coated fabric (so called windows in the woven fabrics). Additives or fillers fill these openings upon coating and dramatically impede the passage of light. Flame-retardant additives or plasticizers that may be used as fillers can also lead to the surface scavenging of dirt from the surroundings and further impede light transmission over time. For this reason, the earliest coated-fabrics for load-bearing structures were used only for applications in which low light transmission was acceptable. Because of the above-mentioned deficiencies concerning light transmission, fire resistance, and environmental durability, the use of these early coated fabrics was limited to "temporary" building structures.

In 1970, coated-fabric composites for use in load-bearing structures were developed using particular coatings and fabric weave arrangements to extend their use from "temporary" structures to permanent architecture. In particular, researchers favored composites of plain-woven fiberglass and perfluoroplastic coating (e.g. polytetrafluoroethylene). Polytetrafluoroethylene (PTFE) is known to offer resistance to the ubiquitous elements of the environment (sunlight, water, oxidizing agents), as well as fire. Researchers combined the beneficial properties of PTFE with the favorable strength/weight ratio aspects of plain-woven, glass fibers to create composites useful in permanent structures.

In 1973, load-bearing composites of plain-woven fiberglass fabric coated with perfluoropolymers were used in tensioned fabric structures. These composites did not incorporate additives to enhance flame resistance. These structural composites, which were manufactured by Chemfab Corporation of Merrimack, N.H. under the names SHEERFILL® I and II, transmitted up to 10% of the incident visible light and maintained adequate structural strength. Later structural composites, such as SHEERFILL® II A, also produced by Chemfab Corporation of Merrimack, N.H., transmitted about 12% of the incident visible light. The development of these types of structures has been summarized in a paper presented at a Symposium on Air-Supported Structures: State-of-the-art sponsored by the Institution of Structural Engineers in London, Jun. 4, 1980. These materials have remained the state-of-the-art up to the present time.

In addition to the primary desirable features of weatherability, non-combustibility, good light transmission, and self-cleaning capacity, load-bearing structures incorporating coated-fabric composites must first and foremost perform as materials of construction. The structures must be strong enough to bear the various static and live loads encountered during use. Moreover, the conditions of fabrication and installation of composites having a preferred mechanical behavior can result in additional mechanical constraints that further narrow the range of primary design parameters.

For example, it is common usage to apply safety factors of 4× to 8× on the uniaxial tensile breaking strength of the fabric reinforced composites used in load-bearing structures. That is, when designing a coated-fabric composite load-bearing structure, an engineer will typically use a fabric having a uniaxial tensile breaking strength that is at least 4× the maximum load that the structure will encounter. Stated in the alternative, the maximum design load will be 25% of the uniaxial tensile breaking strength.

Load-bearing structures typically encounter three types of loads: installation loads, prestress loads, and live loads. As stated above, the load-bearing structures are typically designed so that the maximum of these loads is 25% of the uniaxial tensile breaking strength of the fabric.

The optical density of the woven fiberglass ultimately required to meet the required safety factors at the various loads substantially reduces the light transmitting capability of the fabric, especially after the woven reinforcement is coated with polytetrafluoroethylene. Moreover, clustering the glass fiber content into heavier and bulkier yarns to create a structure with larger gaps or windows, often leads to woven products having undesirable topography that cannot readily be coated or laminated. Even if the coating process difficulties could be overcome, the resultant coated-fabric composite based upon such relatively coarse reinforcement fabrics, frequently does not elongate satisfactorily to facilitate precision patterning of structural panels.

Engineers determine a coated-fabric composite's ability to perform efficiently in a load-bearing structure by referring to modulus curves for the coated-fabric composite. A modulus curve is a plot of the biaxial elongation of the composite versus various biaxial loads applied to the composite. When creating a modulus curve for a coated-fabric composite, an engineer will apply a number of biaxial loads to the coated-fabric composite and measure the biaxial elongations associated with the respective loads. The engineer will typically apply a 1:1 biaxial load when determining biaxial elongation (that is, the loads in the warp and fill directions of the fabric are equal), but loads of different ratios may be applied to determine the biaxial elongation associated with specific loading conditions.

Coated-fabric composites that do not exhibit negative biaxial elongation when subjected to installation, prestress, and live biaxial loads are preferable for use in load-bearing structures. In practice, fiberglass has good strength under tension, but it has inferior properties under compression. Negative biaxial elongation, which is the equivalent of compression, is therefore undesirable as it affects the efficacy of the composite for use in load-bearing structures. To date, engineers have been unable to develop a coated-fabric composite that has high translucency but retains the ability to perform efficiently as part of a load-bearing structure. Prior art composites with high translucency inevitably exhibit negative biaxial elongation values when subjected to installation, prestress and live biaxial loads, or exhibit so little total elongation that their behavior is too brittle for ease of installation in the intended use.

Thus, it is an object of the present invention to produce a coated-fabric composite having improved translucency while providing the tensile breaking strength and biaxial elongation characteristics desirable in load-bearing structures.

It is a further object of the invention to produce a coated-fabric composite that does not exhibit negative biaxial elongation values when it is subjected to installation, prestress, and live loads in both the warp and fill directions at loads up to 25% of the uniaxial tensile breaking strength of the fabric.

SUMMARY OF THE INVENTION

A translucent polymeric composite for use in a load-bearing structure according to the present invention comprises a composite of a woven fabric coated with a polymer. The fabric is constructed according to a particular design, which achieves improved translucency, and also achieves tensile strength and associated biaxial elongation characteristics that are desirable for the composite to be useful in load-bearing structures.

The translucent polymeric composite comprises a woven fabric substrate composed of yarns arranged orthogonally in warp and fill directions, and at least one polymer coating disposed over the substrate. The yarns of the woven fabric are woven in a mock leno pattern. Alternatively, the yarns may be woven in a plain-woven pattern, provided that the yarn count in the fill direction is equal to or greater than about 1.25 times the yarn count in the warp direction.

The composite of the invention has a translucency of at least about 23% of the normally incident visible light. Additionally, when subjected to a 1:1 biaxial load (equal warp and fill stress) up to about 25% of the uniaxial tensile breaking strength of the fabric, the composite exhibits biaxial elongation values that are: a) greater than or equal to zero in the warp direction; and b) greater in the fill direction than in the warp direction.

In a preferred embodiment of the invention, the composite exhibits biaxial elongation values in the warp and fill directions that do not exceed 1.0% and 10%, respectively, when the composite is subjected to 1:1 biaxial loads up to 25% of the uniaxial tensile breaking strength of the fabric.

The woven fabric is most preferably based upon fiberglass yarns for achieving desirable properties, such as outdoor durability and fire resistance. The most preferred materials for coating the woven fabric are perfluoropolymers selected from the group consisting of homopolymers and copolymers of tetrafluoroethylene (TFE), hexafluoropropylene (HFP), and fluorovinyl ethers, including perfluoropropyl and perfluoromethyl vinyl ether (PPVE and PMVE, respectively). These polymers, like the fiberglass reinforcement, are excellent in outdoor durability and fire resistance and also exhibit good light transmission.

Another preferred class of polymers which is useful in a polymer matrix for improved translucency architectural composites includes fluoropolymers based upon monomers including chlorotrifluoroethylene (CTFE), and vinylidene fluoride ($VF_2$), either as homopolymers, or as copolymers with TFE, HFP, PPVE, PMVE, and ethylene or propylene. These fluoropolymers either melt or soften at sufficiently low temperatures so as to enable coating or laminating them onto woven substrates consisting of lower temperature capability yarns such as polyester or nylon.

Another polymeric matrix for coating the woven fabrics may be chosen from the group consisting of polyvinyl chloride, polyvinylidene chloride, polyvinyl alcohol and their copolymers with acrylic acid or acrylic acid esters, or other vinyl ester monomers. In this instance, an additional layer of a fluoropolymer optionally may be disposed (by coating or laminating) over the polymer-coated woven fabric.

The invention is also directed to a method for preparing a translucent polymeric composite for use as an architectural membrane. The method comprises the steps of:

a) preparing a woven fabric by orthogonally arranging yarns in warp and fill directions;

b) selecting the filament type, number, and diameter of yarns; yarn count; yarn crimp; and weave pattern of the fabric so as to result in the composite exhibiting a translucency of at least about 23% of normally incident visible light, and a biaxial elongation such that when the composite is subjected to a 1:1 biaxial load up to 25% of the uniaxial tensile breaking strength of the fabric, the biaxial elongation values are: i) greater than or equal to zero in the warp direction; and ii) greater in the fill direction than in the warp direction; and c) coating the woven fabric with at least one polymer.

An additional step in the method comprises fusing the polymer coating on the woven fabric substrate, provided the substrate can withstand the temperatures required to fuse the polymer. In those instances where the woven substrate cannot withstand the temperature required to fuse the polymer, the method involves the step of separately creating and fusing a polymeric film and then laminating the film to the woven or coated substrate.

BRIEF DESCRIPTION OF THE DRAWINGS

FIG. 5 represents a modulus curve for the coated-fabric composite of the invention.

DETAILED DESCRIPTION OF THE INVENTION

The preferred translucent composite suitable for architectural construction according to this invention contains a woven fabric generated from about 10 to 30 yarns per inch in each of the warp and fill directions. The warp and fill yarns are arranged orthogonally.

Figure 1:
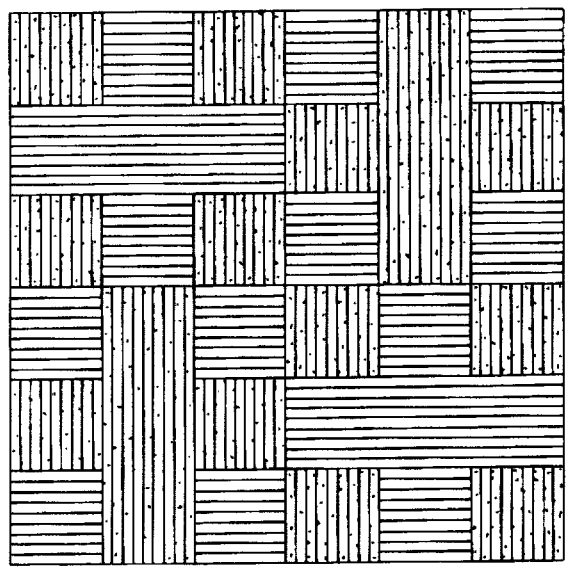
FIG. 1 illustrates a 6×6 mock leno woven fabric pattern according to the invention.
Figure 2:
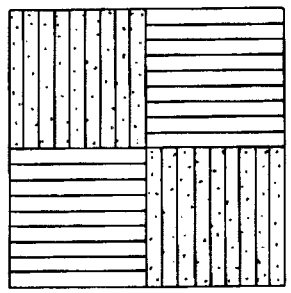
FIG. 2 illustrates a 2×2 plain woven fabric pattern according to the invention.

The yarns of the woven fabric are preferably woven in a mock leno pattern. FIG. 1 shows the weave pattern of a 6×6 mock leno woven fabric. The yarns may also be woven in a plain-woven pattern, provided the yarn count in the fill direction is equal to or greater than about 1.25 times the yarn count in the warp direction. FIG. 2 shows the weave pattern of a 2×2 plain-woven fabric. FIGS. 1 and 2 depict only the woven patterns of fabrics according to the invention, and do not show the open areas that are actually present in the fabric constructions of the invention.

At least one polymer coating is disposed over the fabric yarns. The coated, woven fabric has a translucency of at least about 23% of normally incident visible light and is structured to afford a non-negative biaxial elongation.

When subjected to 1:1 biaxial loads up to 25% of the uniaxial tensile breaking strength of the fabric, the biaxial elongation of the composite in the warp direction is greater than or equal to zero and preferably does not exceed 1.0%. The biaxial elongation of the composite in the fill direction at these levels is greater than the biaxial elongation in the warp direction and preferably does not exceed 10%. The upper limits on the biaxial elongation values in the warp and fill directions are important because above these limits the composite is no longer practically useful; that is, it becomes very difficult to construct a load-bearing structure using the composite.

It has thus been found that the coated-fabric composite of the invention affords a light transmission substantially higher than presently available. The composites of the invention (see Tables IIa–b, discussed below) transmit significantly higher percentages of normally incident visible light as opposed to prior art plain-woven comparative designs of comparable weight, shown in the Tables Ia–c, which also have less favorable mechanical properties.

The uniaxial tensile breaking strength of the composites in the tables is a function of the strength and number of individual fiberglass yarns woven into the reinforcement as well as the crimp induced into the yarns in the weaving process. Increasing the number of yarns in the woven fabric will increase the strength of the composite. However, increasing the crimp in the yarns by the weaving process will lower the strength of the fabric. Thus, selecting the correct number of yarns and the correct crimp becomes an important basis for achieving the desired balance of strength and modulus.

Similarly, the elongation characteristics of the composite are affected by the amount of crimp in combination with the number of yarns, in each orthogonal direction. However, when a biaxial load is applied to a composite using a woven reinforcement, the resultant extension in each direction is also a function of the relative loading in each direction (i.e., warp or fill) and may, therefore, be positive or negative as a function of count, crimp and load ratio. In practice, since fiberglass has good strength under tension, but inferior properties under compression, a negative elongation is undesirable. Thus the prevalent use of fiberglass yarn places an additional constraint on the acceptable count and crimp in order to achieve a positive elongation in both directions.

Furthermore, since nearly all of the light transmitted through the composite is through its "gaps" or "windows" and the size of those windows is determined by the count and crimp together with the yarn diameters, an appropriate count and crimp that would satisfy mechanical strength and modulus criteria usually results in a substantially diminished light transmission or translucency.

Definitions of Terms in the Tables

Tables Ia–c set forth data for various composites of the prior art and Tables IIa–b set forth data for composites of the present invention. The terms used in the tables are described below along with a brief description of the tests typically used to quantify the values listed.

Yarn is a generic term for a continuous strand of textile fibers, filaments or other material in suitable form for knitting, weaving or otherwise inter-twining to form a textile fabric. Yarns occur in the following forms:

(1) a number of fibers twisted together (spun yarn), (2) a number of filaments laid together with or without twist, (3) a single filament with or without twist or (4) a narrow strip or material such as paper, plastic film, or metal foil, with or without twist, intended for use in a fabric construction.

Yarns are listed in the tables in terms of yarn construction, which describes the number of singles yarns and the number of strands combined to form each successive unit of a plied yarn. For example, in Table Ic, NSP A96032a has a yarn construction of B150 4/2, which means that one begins with Beta-sized filaments formed into a singles yarn with a yield 15000 yards/pound. Four of these singles yarns are twisted together into an intermediate material called a 4/0 and then two 4/0 intermediates are plied together to form the 4/2 construction. This construction may be compared to the example construction listed in Table IIa, NSP A96053. In that example, two of the same singles yarn (B150 1/0) are twisted to form the intermediate material called a 2/0 and four of these 2/0 intermediates are plied together to form the 2/4 construction.

Count is the number of warp yarns and fill yarns per inch of woven fabric which corresponds to the number of courses and wales in a knit fabric. Count is determined by placing a piece of fabric on a flat surface, removing unnatural creases, and counting the number of warp and fill yarns per inch of fabric. As can be seen from Tables IIa and b, the count of fabrics of the invention ranges from about 10 to 30 yarns per inch in the warp and fill directions. Count outside this range may also be useful in the invention.

Gauge is a generic term for the various types of devices used to measure either pressure or thickness. For this invention the use of the term, gauge, is understood to mean thickness as reported in the tables. Gauge is determined by a dead-weight dial micrometer test that is well-known in the art.

Uniaxial tensile breaking strength is the ultimate strength of a section of fabric at the instant of being broken in tension along either the warp or fill yarns. This value is generally different than the long term holding strength of the material.

A test for determining uniaxial tensile breaking strength is as follows. Three specimens are cut in the warp direction and three specimens in the fill direction. Specimens are selected so as to avoid testing the same group of yarns more than once. For a warp direction specimen, a warp yarn is traced and marked for at least 8 inches; a second warp yarn is traced and marked about one inch from and parallel to the first (including any partial yarns within the specimen). A similar method is used for outlining fill direction specimens. Using a utility knife, the test specimens are cut out while avoiding nicking the yarns of the test specimen. Each specimen is placed in a tensile tester which is set for a constant rate of extension of 2±0.1 inches per min. With the jaws of the tensile tester 3" apart, the specimen is inserted so that the specimen is centered between the jaws and aligned along the axis of the tester. During the stressing of the specimen, the load versus extension are recorded. The peak load is read as the uniaxial tensile breaking strength of the specimen and the average of the specimens tested for each direction is recorded.

Figure 3:
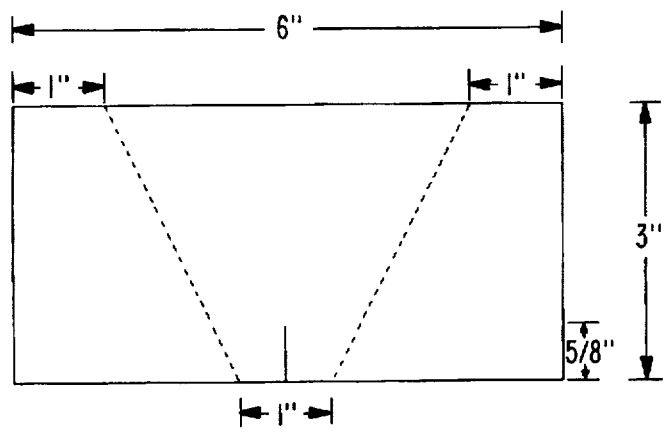
FIG. 3 represents a diagram illustrating a trapezoidal tear strength specimen test layout.

Tear strength (trapezoidal) is the force required to start or continue a tear in a fabric under certain conditions, and may be determined as follows. Three specimens are cut in the warp direction and three specimens in the fill direction. Specimens are selected to avoid testing the same group of yarns more than once. Referring to FIG. 3, each specimen is a rectangle, 3"×6", with the long dimension aligned along a warp yarn for the "warp" test and with the long dimension along a fill yarn for the "fill" test. Using a template, an isosceles trapezoid is marked 3" high with bases of 1" and 4" respectively. A ⅝" long slit is cut in the center of and perpendicular to the 1" trapezoid base. The specimen is placed in a tensile tester which is set for a constant rate of extension of 12±0.5 inches per min. With the jaws of the tensile tester 1" apart, the specimen is inserted so that the trapezoidal marks are parallel with the jaws. The slit is positioned half way between the clamps so that the short side of the trapezoid is taut. The specimen is torn and the load versus time peaks are recorded. After the specimen is torn, the load values of the five highest peaks are read and the average value of these peaks are recorded as the tear strength value for the specimen. (See FIG. 3)

Bow and skew are different defects in the dimensional stability of the fabric. Bow is a measurement of how much the fill yarns in the central section of the fabric are distorted under load from their original configuration while the skew is a measurement of how much the fill yarns are distorted from one edge of the fabric to the other.

Light transmission is a measure of the translucency of the composite and may be determined as follows. A 4"×6" specimen is cut from the sample composite and is prepared for testing by heat bleaching it in an air circulating oven at 720° F.+/−10° F. for 16 hours (−0, +1 hours). The specimen is cooled to room temperature before testing. Samples are tested with a visible light-range spectrophotometer, with the specular component included and with a wide area of view. Measurements are taken at 10 nm intervals from 400 to 750 nm in three places on the specimen (two with one face towards the source and one with the opposite face towards the source). The average of the three readings is recorded at each wavelength. The average % transmission is calculated in the visible region of the solar spectrum by summing the terms found by multiplying the % transmission at 400, 450, 500, 550, 600, 650, 700 and 750 nm by the following weighted factors respectively: 0.0575, 0.123, 0.148, 0.145, 0.142, 0.143, 0.135, and 0.106.

Open Area is used as a predictor to describe the % planar area of the woven fabric reinforcement which does not contain yarn. Open area may be calculated from the following equation:

$$\% \text{ Open Area} = (1-C_w \times D_w) \times (1-C_f \times D_f) \times 100$$

where $C_w$ and $C_f$ are the warp and fill counts respectively and $D_w$ and $D_f$ are the diameters of the warp and fill yarns respectively. Counts are obtained by the method outlined above. Yarn "diameters" are actually the length of the major axis of the elliptical cross-section of the yarns occasioned by the flattening of the yarns as they are tensioned in the weaving and coating process. They are measured either by direct microscopy, or by extrapolation of "diameter" data from similarly plied yarns. The major axis diameters used in the calculations for the tables shown below were:

| yarn type | diameter (inches) |
| --- | --- |
| B150 4/2 | 0.0300 |
| B150 4/3 | 0.0382 |
| B150 2/2 | 0.0193 |
| B150 2/4 | 0.0284 |
| B150 2/3 | 0.0246 |

Elongation is a measure of the deformation in the direction of load as caused by a tensile force. One may measure elongation at a specific load or at tensile break using a static or a dynamic test, depending on the application. For specific applications it is useful to measure the fabric elongation under biaxial loads as well as uniaxial loads. Percent elongation is usually measured at specific loads, such as prestress or maximum loads. The maximum biaxial stress as described in the experimental data below is that load which is 25% of the uniaxial load that would result in rupture of the fabric.

Uniaxial elongation may be measured as follows. Three specimens are cut in the warp direction and three specimens in the fill direction. For a warp direction specimen, a warp yarn is traced and marked by a line over the surface for at least a length of 16 inches. A second warp yarn, one inch away and parallel to the first (include any partial yarns within the specimen) is similarly traced and marked. In like manner, specimens are traced and marked for generating fill direction specimens. Using a utility knife, the test specimens are then cut along the marked lines for tensile evaluation. Care is taken not to nick the yarns of the test specimen. After all of the specimens are cut, they are laid out on a table to be marked. With a steel ruler and dividers, a 10" section is measured approximately 3" in from the end of each specimen. The 10" length is marked by pressing the dividers into the fabric, thereby making a small hole. The hole is marked with a pen for quick identification. With the marked gauge length facing outward, one end of the specimen is secured in a weight holding clamp and the other end of the sample in a clamp attached to a stationary rack. This step is repeated with the other specimens. When all the specimens are secured to the rack, a 40# weight is hung on each of the lower clamps. After one hour, the distance is measured between the holes marked on the specimens. The measurements are taken while the specimens remain under load. Using the dividers, the points are placed into the holes and the distance is measured using the 100ths increment scale of the steel ruler. The elongation of each specimen is calculated by the following formula:

$$\% \text{ Uniaxial Elongation} = \frac{L - L_o}{L_o} \times 100$$

where L is the length between holes after one hour of stressing, and $L_o$ is the initial length between holes. The average of the specimens tested for each direction is recorded to the first decimal place.

Figure 4:
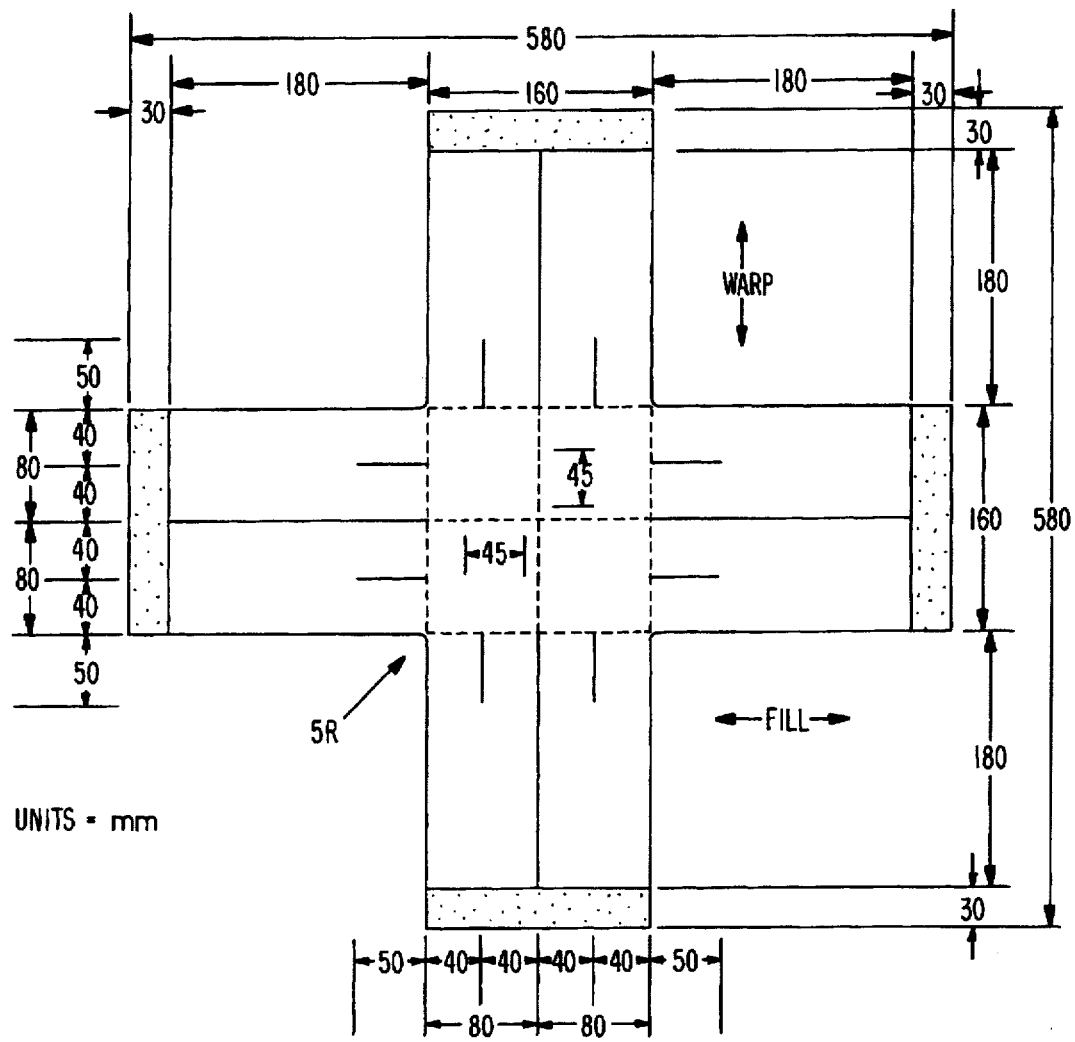
FIG. 4 represents a diagram illustrating a biaxial elongation specimen test layout.

Biaxial elongation is measured as follows. As illustrated in the diagram of FIG. 4, the specimen is a cruciform with the arms aligned with the warp and fill directions of the fabric. The overall length along each direction is 580 mm (22.83 inches) and the width of each arm is 160 mm (6.30 inches). The specimen corners are rounded with a 5 mm (0.20 inch) radius. Each arm is slit in half lengthwise from the center biaxial field to the end of the arm and with 50 mm (1.96 inches) slits as shown in FIG. 4. Three specimens are taken from the part of the fabric which is at least 75 mm (2.95 inches) from each selvage.

The testing machine applies to the specimen a 1:1 load ratio in the warp and fill directions simultaneously. The loads in the warp and fill directions are applied from both sides of the specimen so that the center point of the specimen is not changed.

When mounting the specimen on the testing machine, chucking clamps are fixed to a pre-determined position on the cruciform arms with the warp and fill directions aligned with the testing machine. The specimen is fixed so that excessive stress does not affect the specimen and excessive wrinkling does not occur. The specimen is clamped so that uniform force is applied in the warp and fill directions during the test and tightly enough that slipping does not occur between the specimen and the clamps.

Strain generated in the biaxial field at the center of the specimen is measured in the warp and fill directions simultaneously with the load. The distance between the initial extension measurement points is between 20 mm (0.79 inch) and 80 mm (3.15 inches).

After each test specimen is attached to the testing machine, the stress-strain values are measured as described below (Whenever the load is applied or removed, the load ratio and the loading rate are maintained.):

(1) While maintaining an axial load ratio of 1:1 for the warp and fill directions, each axis is loaded at 4 mm/min (0.16 inch/min) to ¼ (25%) of the uniaxial tensile breaking strength of the fabric and load-extension values are recorded as the first loading cycle.

(2) After its application, the load is immediately reduced to ¹/₂₀ (5%) of the uniaxial tensile breaking strength. The sample is held at ¹/₂₀ (5%) of its uniaxial tensile breaking strength for 5 minutes and then relaxed to zero load.

(3) The specimen is reloaded at 4 mm/min (0.16 inch/min) to ¼ (25%) of the uniaxial tensile breaking strength and the values are recorded as the second loading cycle. The specimen is then immediately relaxed to zero load. This cycle, without the holding period, is repeated once more and values are recorded for the third loading cycle.

The data for the three specimens are plotted on a graph and the elongation values at specific comparative points are recorded. FIG. 5 is an example of a graph showing the stress strain data for the first and third loading cycles. Comparative values for elongation (denoted as strain on the graph) may be read from these graphs. The customary points of comparison are the strain at the estimated installation load (39 pli on the first loading cycle), the strain at the prestress load after removing material hysteresis (11 pli on the third loading cycle), and the strain at the maximum biaxial test load after removing material hysteresis. Values for these three customary points of comparison are set forth in the tables.

Other specimens were tested at load ratios of 2:1, 1:2, 1:0 and 0:1. The change in strain during the third loading cycle for each of these tests was used in calculating the tensile modulus and the Poisson's ratio of the material.

Comparative Test Results

Tables Ia, b, and c illustrate the problems associated with prior-art plain-woven fiberglass fabrics which may have an appropriate overall tensile strength but are limited in overall light transmission and lack appropriate elongations under biaxial loads even if the yarns are deployed at varying warp and fill counts. As a result, it has been difficult or impossible to avoid negative warp elongation.

As shown in Table IIa, in examples NSP A96037a, NSP A96037b, NSP A96047a, NSP A96047b, and NSP A96053, use of a mock leno type woven style of fiberglass in the composite not only overcomes the limited translucency of the plain-woven fabric reinforced composites of the prior art, but actually facilitates significantly higher light transmission than the currently available PTFE-coated woven fiberglass products for architectural end-use. The elongation characteristics of the various embodiments tabulated in Table IIa indicate that mock leno weave type composites may be patterned and installed in a manner similar to the current art plain woven products while exhibiting substantially higher translucency.

The data listed in Table IIa show the advantageous aspects of a mock leno weave style composite including the composite's desirable translucency and mechanical properties. The data show relatively high tensile breaking strength as well as positive (i.e., non-negative) biaxial elongations in the warp and fill directions. Specifically, these composites have a translucency of 23.4–28.8%, and when subjected to 1:1 biaxial loads up to 25% of the uniaxial tensile breaking strength of the fabric, the composites exhibit biaxial elongation values of 0.04–0.42% in the warp direction and 0.70–3.17% in the fill direction. Thus, the composites exhibit excellent translucency properties and will mechanically perform well in tensioned structures.

The mock leno woven reinforcement of the invention forms an advantageously large size gap or window when under tension thereby increasing the translucency. Moreover, the elongation characteristics of this preferred type of fabric which is advantageously superior to that of a plain woven fabric is apparently due to its hybrid structural mixture of plain woven and satin-woven styles.

According to the preferred embodiment of the inventive composite, an improved light transmission nearly a third higher than in presently available PTFE/fiberglass architectural fabrics has been achieved by use of mock leno weave reinforced composite while exhibiting non-negative, biaxial elongation properties in both the warp or the fill direction.

Table IIb shows data for plain woven composites according to the invention. Composites NSP A96024a-c of Table IIb are embodiments where the yarn count in the fill direction is equal to or greater than 1.25 times the yarn count in the warp direction. These composites have translucency values of 21.6–25%, and when subjected to 1:1 biaxial installation, prestress, and maximum loads up to 25% of the uniaxial tensile breaking strength of the fabric, the composites exhibit biaxial elongation values of 0.0–0.15% in the warp direction and of 2.5–8.6% in the fill direction.

Composite NSP A96024d in Table IIb has a fabric yarn construction of 12×14 (w×f), and thus the yarn count in the fill direction is less than 1.25 times the yarn count in the warp direction. The resulting composite exhibits negative biaxial elongation values when subjected to certain loads. As explained above, the negative biaxial elongation values make such composite constructions undesirable for use as load-bearing structures.

EXAMPLE 1

The preferred embodiment of the invention having at least about 23% translucency was prepared to meet certain target tensile or breaking strengths in warp (w) and fill (f) directions. The biaxial elongation was not to exhibit negative stress values. Accordingly, the elongation of warp (BEW) is greater than zero while elongation of fill (BEF) is greater than BEW.

Accordingly, an 11 osy (ounce per square yard) fiberglass fabric coating substrate was woven. The substrate was a 6×6 mock leno weave consisting of B150 ¾ yarns in both warp and fill direction. The count was 19×16.5 yarns/inch in the warp and fill direction, respectively. This substrate, designated CHEMFAB style NSP A96053 (shown in Table IIa), was heat-cleaned to remove residual sizing. The substrate was then relubricated by applying a methylphenyl silicone oil (ET-4327 obtained from Dow Corning as an aqueous emulsion, 35% solids). The oil was applied to the substrate at 4% by weight by dipping and drying in a two zone coating tower with a drying zone temperature of 200°–300° F. and a sintering zone temperature set at 550° F. In the first coating only the yarns in the substrate were coated, while the windows remained open.

A second coating, totaling approximately 7.5 osy was applied by dipping the substrate in an aqueous dispersion of PTFE (T313A obtained from Dupont and applied at 53% solids). The coating was dried and sintered in a two-zone coating tower with drying temperatures of 350° F. and sintering zone temperatures 680° F.

A third coating, totaling approximately 15 osy, was applied from a formulation of T313A, with an additional 4% (by weight based on PTFE solids) of a surfactant (Triton X-100 from Union Carbide). The coating was applied at 56.3% in several passes, by dipping, drying and baking or sintering in a two-zone tower. The drying zone temperature was 350° F. The sintering zone temperature was 680° F. on passes 1, 4 and 5; and it was 600° F. on passes 2 and 3.

The composite was finished with a topcoat using PFA dispersion (TE-9946 obtained from DuPont and applied at 38% solids). The topcoat was applied at about 1.5 osy by dipping, drying and sintering in a two-zone tower. The drying temperature was 350° F., and the sintering temperature was 680° F.

The results of physical tests with this composite are set forth in Table IIb which shows that the translucency of the composite was 23.4%, and the biaxial elongation values when the composite was subjected to installation, prestress, and maximum loads up to 25% of the uniaxial tensile breaking strength were 0.04–0.19% in the warp direction and 1.87–3.17% in the fill direction.

FIG. 5 shows a modulus curve for the composite NSP A96053. FIG. 5 shows curves for the first and third loading cycles. The curve for the second loading cycle falls within these first and third loading cycle curves. These curves represent the biaxial elongation of one of the three NSP A96053 specimens tested.

As can be seen from FIG. 5, when the composite is subjected to 1:1 biaxial loads from 0 to about 140 pli (approximately 25% of the "designed" uniaxial tensile breaking strength of the fabric, which is somewhat less than the actual uniaxial tensile breaking strengths shown in the figure), the biaxial elongation is greater than or equal to zero in the warp direction, and is greater in the fill direction than in the warp direction. This composite with its high translucency characteristics is structurally sufficient for use in a load-bearing structure.

The invention is deemed to cover all the modifications and equivalents of the embodiment described in the specification and example, within the scope of the claims.

TABLE Ia

| PROPERTY | NSP A96012a | NSP A96012b | NSP A96021 |
|---|---|---|---|
| yarn construction (w × f) | B150 4/2 × B150 4/3 | B150 4/2 × B150 4/3 | B150 4/2 × B150 4/3 |
| greige count (w × f) - number/inch | 17 × 13.5 | 17 × 12.5 | 16 × 13 |
| gauge - mils (thickness) | 29.3 | 30.6 | 28.6 |
| tensile breaking strength (w × f) - pli | 747 × 722 | 720 × 733 | 701 × 735 |
| tear strength (w × f) - lbs (trapezoid) | 59 × 101 | 63 × 95 | 63 × 113 |
| bow - % | 0.5 | 0.1 | 2.3 |
| skew - % | 0.3 | 0.1 | 3.1 |
| light transmission - % | 20.8 | 21.7 | 24.2 |
| open area - % | 23.7 | 25.6 | 26.2 |
| uniaxial elongation @ 40 pli (w × f) - % | 0.8 × 7.6 | 1.0 × 7.7 | 1.8 × 6.4 |
| biaxial elongation (w × f) at | | | |
| installation load - % | 0.4 × 3.2 | 0.35 × 04.85 | 0.10 × 2.8 |
| laod'g 3 at prestress - % | 0.1 × 3.6 | 0.0 × 5.0 | −0.4 × 3.45 |
| load'g 3 at max load - % | −0.05 × 5.5 | −0.15 × 7.0 | −0.4 × 4.9 |

TABLE Ib

| PROPERTY | NSP A96025a | NSP A96025b | NSP A96025c | NSP A96025d | NSP A96025e | NSP A96025f |
|---|---|---|---|---|---|---|
| yarn construction (w × f) | B150 4/2 × B150 4/2 | B150 4/2 × B150 4/2 | B150 4/2 × B150 4/2 | B150 4/2 × B150 4/2 | B150 4/2 × B150 4/2 | B150 4/2 × B150 4/2 |
| greige count (w × f) - number/inch | 20 × 20 | 20 × 19 | 20 × 18 | 20 × 17 | 20 × 16 | 20 × 15 |
| gauge - mills (thickness) | 22.2 | 22.8 | 22.4 | 22.1 | 22.7 | 22.4 |
| tensile breaking strength (w × f) - pli | 766 × 839 | 782 × 815 | 756 × 715 | 781 × 645 | 828 × 662 | 792 × 578 |
| tear strength (w × f) - lbs (trapezoid) | 69 × 91 | 70 × 82 | 69 × 84 | 74 × 74 | 72 × 70 | 74 × 72 |
| bow - % | 0.6 | 0.9 | 1.0 | 0.9 | 0.6 | 0.5 |
| skew - % | 0.6 | 0.5 | 0.4 | 0.6 | 0.0 | 0.0 |
| light transmission - % | 17.8 | 19.0 | 19.5 | 20.2 | 22.4 | 22.4 |
| open area - % | 16.0 | 17.2 | 18.4 | 19.6 | 20.8 | 22.0 |

TABLE Ib-continued

| PROPERTY | NSP A96025a | NSP A96025b | NSP A96025c | NSP A96025d | NSP A96025e | NSP A96025f |
|---|---|---|---|---|---|---|
| uniaxial elongation @ 40 pli (w × f) - % | 1.4 × 2.1 | 1.5 × 2.6 | 1.45 × 2.6 | 1.0 × 2.8 | 1.1 × 3.1 | 1.1 × 3.1 |
| biaxial elongation (w × f) | | | | | | |
| at installation load - % | 0.1 × 0.8 | 0.15 × 0.95 | 0.15 × 0.85 | 0.1 × 0.7 | 0.0 × 1.05 | 0.0 × 1.25 |
| load'g 3 at prestress - % | 0.15 × 0.9 | 0.15 × 1.0 | 0.25 × 0.9 | 0.0 × 0.8 | −0.05 × 1.2 | −0.25 × 1.35 |
| load'g 3 at max load - % | 0.4 × 1.8 | 0.4 × 2.0 | 0.5 × 1.9 | 0.15 × 1.9 | 0.05 × 2.3 | −0.25 × 2.6 |

TABLE Ic

| PROPERTY | NSP A96032a | NSP A96032b | NSP A96038a | NSP A96038b |
|---|---|---|---|---|
| yarn construction (w × f) | B150 4/2 × B150 4/2 | B150 4/2 × B150 4/2 | B150 4/2 × B150 4/2 | B150 4/2 × B150 4/2 |
| greige count (w × f) - number/inch | 18 × 17 | 18 × 16 | 17 × 17 | 17 × 16 |
| gauge - mils (thickness) | 23.5 | 24.4 | 25.8 | 25.2 |
| tensile breaking strength (w × f) - pli | 792 × 618 | 737 × 577 | 802 × 658 | 807 × 617 |
| tear strength (w × f) - lbs (trapezoid) | 73 × 74 | 70 × 71 | 72 × 72 | 81 × 76 |
| bow - % | 2.3 | 3.0 | 0.6 | 3.1 |
| skew - % | 0.5 | 1.0 | 2.4 | 0.2 |
| light transmission - % | 22.2 | 22.2 | 20.1 | 21.5 |
| open area - % | 22.5 | 23.9 | 24.0 | 25.5 |
| uniaxial elongation @ 40 pli (w × f) - % | 0.6 × 4.2 | 1.0 × 5.0 | 1.1 × 6.1 | 0.8 × 6.5 |
| biaxial elongation (w × f) at | | | | |
| installation load - % | −0.1 × 1.45 | 0.1 × 2.25 | 0.1 × 3.6 | 0.2 × 3.25 |
| load'g 3 at prestress - % | −0.45 × 1.6 | −0.3 × 2.95 | −0.4 × 4.1 | −0.2 × 3.6 |
| load'g 3 at max load - % | −0.5 × 3.2 | −0.3 × 4.75 | −0.4 × 5.7 | −0.2 × 5.3 |

TABLE IIa

| PROPERTY | NSP A96037a | NSP A96037a | NSP A96047a | NSP A96047b | NSP A96053 |
|---|---|---|---|---|---|
| yarn construction (w × f) | B150 2/2 × B150 2/2 | B150 2/2 × B150 2/2 | B150 2/4 × B150 2/4 | B150 2/4 × B150 2/4 | B150 2/4 × B150 2/4 × |
| greige count (w × f) - number/inch | 24 × 24 | 24 × 28 | 18 × 16 | 18 × 15 | 19 × 16.5 |
| gauge - mils (thickness) | 19.5 | 19.5 | 31.0 | 30.5 | 30.5 |
| tensile breaking strength (w × f) - pli | 528 × 505 | 524 × 543 | 713 × 6323 | 750 × 600 | 817 × 647 |
| tear strength (w × f) - lbs (trapezoid) | 41 × 51 | 41 × 60 | 93 × 105 | 83 × 105 | 84 × 85 |
| bow - % | 1.0 | 0.3 | — | — | 0.6 |
| skew - % | 0.7 | 1.3 | — | — | 0.2 |
| light transmission - % | 28.8 | 25.5 | 27.5 | 27.7 | 23.4 |
| open area - % | 28.8 | 24.7 | 26.7 | 28.1 | 24.5 |
| uniaxial elongation @ 40 pli (w × f) - % | 0.5 × 1.8 | 0.6 × 1.7 | 0.5 × 4.3 | 0.6 × 3.0 | 0.7 × 3.4 |
| biaxial elongation (w × f) at | | | | | |
| installation load - % | 0.09 × 1.07 | 0.07 × 0.73 | 0.11 × 1.78 | 0.17 × 1.75 | 0.16 × 1.87 |
| load'g 3 at prestress - % | 0.10 × 1.07 | 0.07 × 0.70 | 0.11 × 1.74 | 0.05 × 1.84 | 0.04 × 1.95 |
| load'g 3 at max load - % | 0.42 × 2.15 | 0.40 × 1.71 | 0.20 × 3.13 | 0.07 × 2.95 | 0.19 × 3.17 |

TABLE IIb

| PROPERTY | NSP A96024a | NSP A96024b | NSP A96024c | NSP A96024d |
|---|---|---|---|---|
| yarn construction (w × f) | B150 4/3 × B150 4/2 | B150 4/3 × B150 4/2 | B150 4/3 × B150 4/2 | B150 4/3 × B150 4/2 |
| greige count (w × f) - number/inch | 12 × 17 | 12 × 16 | 12 × 15 | 12 × 14 |
| gauge - mils (thickness) | 29.5 | 30.0 | 31.5 | 30.4 |
| tensile breaking strength (w × f) - pli | 840 × 578 | 810 × 575 | 745 × 565 | 737 × 505 |
| tear strength (w × f) - lbs (trapezoid) | 98 × 67 | 91 × 66 | 112 × 65 | 97 × 60 |

TABLE IIb-continued

| PROPERTY | NSP A96024a | NSP A96024b | NSP A96024c | NSP A96024d |
| --- | --- | --- | --- | --- |
| bow - % | 4.3 | — | 5.3 | 5.6 |
| skew - % | 1.6 | — | 3.0 | 2.3 |
| light transmission - % | 21.6 | 23.5 | 25.0 | 26.6 |
| open area - % | 26.5 | 28.2 | 29.8 | 31.4 |
| uniaxial elongation @ 40 pli (w × f) - % | 0.9 × 5.2 | 0.6 × 5.4 | 0.6 × 6.7 | 0.7 × 6.9 |
| biaxial elongation (w × f) at | | | | |
| installation load - % | 0.15 × 2.45 | 0.15 × 2.6 | 0.15 × 4.25 | 0.10 × 3.85 |
| load'g 3 at prestress - % | 0.1 × 2.65 | 0.0 × 3.0 | 0.0 × 5.65 | −0.25 × 4.30 |
| load'g 3 at max load - % | 0.1 × 4.35 | 0.0 × 4.85 | 0.05 × 8.6 | −0.25 × 6.65 |

What is claimed is:

1. A translucent polymeric composite for use in a load-bearing structure, the composite comprising:
    a woven fabric substrate composed of yarns arranged orthogonally in warp and fill directions; and
    at least one polymer coating disposed over the substrate;
    the composite having a translucency of at least about 23% of normally incident visible light, and when subjected to 1:1 biaxial loads up to 25% of the uniaxial tensile breaking strength of the fabric, the composite exhibits biaxial elongation values that are:
    a) greater than or equal to zero in the warp direction; and
    b) greater in the fill direction than in the warp direction.

2. The composite according to claim 1, wherein the biaxial elongation value in the warp direction does not exceed 1.0% when the composite is subjected to 1:1 biaxial loads up to 25% of the uniaxial tensile breaking strength of the fabric.

3. The composite according to claim 2, wherein the biaxial elongation value in the fill direction does not exceed 10% when the composite is subjected to 1:1 biaxial loads up to 25% of the uniaxial tensile breaking strength of the fabric.

4. The composite according to claim 3, wherein the woven fabric is fiberglass or polyester.

5. The composite according to claim 4, wherein the polymer coating comprises a fluoropolymer selected from the group consisting of monomers of chlorotrifluoroethylene (CTFE), and vinylidene fluoride (VF$_2$), either as homopolymers, or as copolymers with TFE, HFP, PPVE, PMVE, and ethylene or propylene.

6. The composite according to claim 4, wherein the polymer coating comprises a perfluoropolymer selected from the group consisting of homopolymers and copolymers of tetrafluoroethylene (TFE), hexafluoropropylene (HFP), and fluorovinyl ethers, including perfluoropropyl and perfluoromethyl vinyl ether.

7. The composite according to claim 4, wherein the polymer coating comprises a polymer selected from the group consisting of polyvinyl chloride, polyvinylidene chloride, polyvinyl alcohol and their copolymers with acrylic acid or acrylic acid esters, or other vinyl ester monomers.

8. The composite according to claim 7, further comprising a top-coat of a fluoropolymer disposed over the polymer coating.

9. A tensioned load-bearing membrane comprising a frame and the composite of claim 3 disposed over the frame.

10. A translucent polymeric composite for use in a load-bearing structure, the composite comprising:
    a woven fabric substrate composed of yarns arranged orthogonally in warp and fill directions, said yarns woven in a mock leno pattern;
    at least one polymer coating disposed over the substrate;
    the composite having a translucency of at least about 23% of normally incident visible light, and when subjected to 1:1 biaxial loads up to 25% of the uniaxial tensile breaking strength of the fabric, the composite exhibits biaxial elongation values that are:
    a) greater than or equal to zero in the warp direction; and
    b) greater in the fill direction than in the warp direction.

11. The composite according to claim 10, wherein the biaxial elongation value in the warp direction does not exceed 1.0% when the composite is subjected to 1:1 biaxial loads up to 25% of the uniaxial tensile breaking strength of the fabric.

12. The composite according to claim 11, wherein the biaxial elongation value in the fill direction does not exceed 10% when the composite is subjected to 1:1 biaxial loads up to 25% of the uniaxial tensile breaking strength of the fabric.

13. The composite according to claim 12, wherein the woven fabric is fiberglass or polyester.

14. The composite according to claim 13, wherein the polymer coating comprises a fluoropolymer selected from the group consisting of monomers of chlorotrifluoroethylene (CTFE), and vinylidene fluoride (VF$_2$), either as homopolymers, or as copolymers with TFE, HFP, PPVE, PMVE, and ethylene or propylene.

15. The composite according to claim 13, wherein the polymer coating comprises a perfluoropolymer selected from the group consisting of homopolymers and copolymers of tetrafluoroethylene (TFE), hexafluoropropylene (HFP), and fluorovinyl ethers, including perfluoropropyl and perfluoromethyl vinyl ether.

16. The composite according to claim 13, wherein the polymer coating comprises a polymer selected from the group consisting of polyvinyl chloride, polyvinylidene chloride, polyvinyl alcohol and their copolymers with acrylic acid or acrylic acid esters, or other vinyl ester monomers.

17. The composite according to claim 16, further comprising a top-coat of a fluoropolymer disposed over the polymer coating.

18. A tensioned load-bearing membrane comprising a frame and the composite of claim 12 disposed over the frame.

19. A translucent polymeric composite for use in a load-bearing structure, the composite comprising:
    a woven fabric substrate composed of yarns arranged orthogonally in warp and fill directions, said yarns woven in a plain woven pattern, the fabric substrate having warp and fill yarn counts, and the fill yarn count is equal to or greater than about 1.25 times the warp yarn count;

at least one polymer coating disposed over the substrate;

the composite having a translucency of at least about 23% of normally incident visible light, and when subjected to 1:1 biaxial loads up to 25% of the uniaxial tensile breaking strength of the fabric, the composite exhibits biaxial elongation values that are:
   a) greater than or equal to zero in the warp direction; and
   b) greater in the fill direction than in the warp direction.

20. The composite according to claim 19, wherein the biaxial elongation value in the warp direction does not exceed 1.0% when the composite is subjected to 1:1 biaxial loads up to 25% of the uniaxial tensile breaking strength of the fabric.

21. The composite according to claim 20, wherein the biaxial elongation value in the fill direction does not exceed 10% when the composite is subjected to 1:1 biaxial loads up to 25% of the uniaxial tensile breaking strength of the fabric.

22. The composite according to claim 21, wherein the woven fabric is fiberglass or polyester.

23. The composite according to claim 22, wherein the polymer coating comprises a fluoropolymer selected from the group consisting of monomers of chlorotrifluoroethylene (CTFE), and vinylidene fluoride ($VF_2$), either as homopolymers, or as copolymers with TFE, HFP, PPVE, PMVE, and ethylene or propylene.

24. The composite according to claim 23, wherein the polymer coating comprises a perfluoropolymer selected from the group consisting of homopolymers and copolymers of tetrafluoroethylene (TFE), hexafluoropropylene (HFP), and fluorovinyl ethers, including perfluoropropyl and perfluoromethyl vinyl ether.

25. The composite according to claim 23, wherein the polymer coating comprises a polymer selected from the group consisting of polyvinyl chloride, polyvinylidene chloride, polyvinyl alcohol and their copolymers with acrylic acid or acrylic acid esters, or other vinyl ester monomers.

26. The composite according to claim 25, further comprising a top-coat of fluoropolymer disposed over the polymer coating.

27. A tensioned load-bearing membrane comprising a frame and the composite of claim 21 disposed over the frame.

28. A method for preparing a translucent polymeric composite for use in a load-bearing structure, the method comprising the steps of:
   a) preparing a woven fabric by orthogonally arranging yarns in warp and fill directions;
   b) selecting the filament type, number, and diameter of yarns; yarn count; yarn crimp; and weave pattern of the fabric to result in the composite exhibiting a translucency of at least about 23% of normally incident visible light, and a biaxial elongation such that when the composite is subjected to 1:1 biaxial loads up to 25% of the uniaxial tensile breaking strength of the fabric, the biaxial elongation values are:
      i) greater than or equal to zero in the warp direction; and
      ii) greater in the fill direction than in the warp direction;
   c) coating the woven fabric with at least one polymer; and
   d) fusing each polymer coating.

29. A method for preparing a translucent polymeric composite for use in a load-bearing structure, the method comprising the steps of:
   a) preparing a woven fabric by orthogonally arranging yarns in warp and fill directions;
   b) selecting the filament type, number, and diameter of yarns; yarn count; yarn crimp; and weave pattern of the fabric to result in the composite exhibiting a translucency of at least about 23% of normally incident visible light, and a biaxial elongation such that when the composite is subjected to 1:1 biaxial loads up to 25% of the uniaxial tensile breaking strength of the fabric, the biaxial elongation values are:
      i) greater than or equal to zero in the warp direction; and
      ii) greater in the fill direction than in the warp direction;
   c) separately creating and fusing a polymeric film; and
   d) laminating the film to the fabric.

30. The method according to any of claims 28 or 29, further comprising selecting the filament type, number, and diameter of yarns; yarn count; yarn crimp; and weave pattern of the fabric to result in the composite exhibiting a biaxial elongation value in the warp direction that does not exceed 1.0% when the composite is subjected to 1:1 biaxial loads up to 25% of the uniaxial tensile breaking strength of the fabric.

31. The method according to claim 30, further comprising selecting the filament type, number, and diameter of yarns; yarn count; yarn crimp; and weave pattern to result in the composite exhibiting a biaxial elongation value in the fill direction that does not exceed 10% when the composite is subjected to 1:1 biaxial loads up to 25% of the uniaxial tensile breaking strength of the fabric.

32. The method according to claim 31, further comprising providing fiberglass or polyester yarns for the preparation of the woven fabric.

33. The method according to claim 32, further comprising providing a fluoropolymer for coating the fabric substrate, wherein said fluoropolymer is selected from the group consisting of monomers of chlorotrifluoroethylene (CTFE), and vinylidene fluoride ($VF_2$), either as homopolymers, or as copolymers with TFE, HFP, PPVE, PMVE, and ethylene or propylene.

34. The method according to claim 32, further comprising providing a perfluoropolymer for coating the fabric substrate, wherein the perfluoropolymer is selected from the group consisting of homopolymers and copolymers of tetrafluoroethylene (TFE), hexafluoropropylene (HFP), and fluorovinyl ethers, including perfluoropropyl and perfluoromethyl vinyl ether.

35. The composite according to claim 32, wherein the polymer coating comprises a polymer selected from the group consisting of polyvinyl chloride, polyvinylidene chloride, polyvinyl alcohol and their copolymers with acrylic acid or acrylic acid esters, or other vinyl ester monomers.

36. A translucent polymeric composite for use in a load-bearing structure produced according to the method of any of claims 28 or 29.

* * * * *